(12) United States Patent
Aldereguia et al.

(10) Patent No.: US 8,688,887 B2
(45) Date of Patent: Apr. 1, 2014

(54) COMPUTER PERIPHERAL EXPANSION APPARATUS

(75) Inventors: Alfredo Aldereguia, Raleigh, NC (US); Carl A Morrell, Raleigh, NC (US); Grace A. Richter, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1104 days.

(21) Appl. No.: 12/644,629

(22) Filed: Dec. 22, 2009

(65) Prior Publication Data

US 2011/0153899 A1 Jun. 23, 2011

(51) Int. Cl.
*G06F 13/00* (2006.01)
(52) U.S. Cl.
USPC .......................... 710/313; 710/300; 710/316
(58) Field of Classification Search
USPC ................................ 710/300, 305, 313, 316
See application file for complete search history.

(56) References Cited

U.S. PATENT DOCUMENTS

| | | | |
|---|---|---|---|
| 5,557,754 A | 9/1996 | Sone et al. |
| 6,351,786 B2 | 2/2002 | Elmore et al. |
| 6,381,141 B2 | 4/2002 | Corisis et al. |
| 6,714,546 B1 | 3/2004 | Ogura et al. |
| 6,914,324 B2 | 7/2005 | Rapport et al. |
| 7,032,052 B2 | 4/2006 | Sauber et al. |
| 7,085,599 B2 | 6/2006 | King et al. |
| 7,146,538 B2 | 12/2006 | Johnson et al. |
| 7,200,021 B2 | 4/2007 | Raghuram |
| 7,292,946 B2 | 11/2007 | Huang et al. |
| 7,295,566 B1 | 11/2007 | Chiu et al. |
| 2003/0188068 A1 | 10/2003 | McTague |
| 2004/0105242 A1 | 6/2004 | Evans |
| 2004/0210800 A1 | 10/2004 | Vecoven et al. |
| 2005/0186810 A1 | 8/2005 | Sardella et al. |
| 2006/0129731 A1 | 6/2006 | Wallace et al. |
| 2008/0077718 A1 | 3/2008 | Kn et al. |

(Continued)

FOREIGN PATENT DOCUMENTS

EP 0372801 A2 6/1996

OTHER PUBLICATIONS

IP.COM Electronic Publication IPCOM000178126D: "Method to Manage Expansion Unit VPD Addresses based on Blade Locations and ascertain Next Unit Presence for VPD Address Ability." Authors: IBM; publication date: Jan. 16, 2009.

*Primary Examiner* — Glenn A Auve
(74) *Attorney, Agent, or Firm* — Brandon C. Kennedy; Katherine S. Brown; Biggers Kennedy Lenart Spraggins LLP (57) ABSTRACT

Computer peripheral expansion apparatus, methods of operation, and computer program products including blade peripheral expansion units ('BPEUs'), each BPEU including a peripheral interconnect multiplexer coupled for peripheral interconnect data communications through an upstream peripheral interconnect bus ('PIB') segment to a host blade, the upstream PIB segment fanned out by the multiplexer into two or more peripheral downstream interconnect channels, the multiplexer connecting the upstream PIB segment to only one of the downstream channels at a time; and the two or more downstream peripheral interconnect channels, at least one of the downstream channels connected to at least one peripheral interconnect device ('PID') in the BPEU, the peripheral interconnect device being a device that communicates with the host blade according to a peripheral interconnect data communications protocol, one of the downstream channels configured to connect to an upstream PIB segment in another BPEU.

20 Claims, 4 Drawing Sheets

(56) References Cited

U.S. PATENT DOCUMENTS

| | | |
|---|---|---|
| 2008/0101147 A1 | 5/2008 | Amidi |
| 2008/0126597 A1 | 5/2008 | Hirai |
| 2008/0186130 A1 | 8/2008 | Trevino et al. |
| 2008/0256281 A1 | 10/2008 | Fahr et al. |
| 2008/0320265 A1 | 12/2008 | Yung et al. |
| 2009/0045882 A1 | 2/2009 | Kim et al. |
| 2009/0119420 A1 | 5/2009 | Morrell |
| 2011/0258472 A1* | 10/2011 | Mukherjee et al. ........... 713/340 |

* cited by examiner

COMPUTER PERIPHERAL EXPANSION APPARATUS

BACKGROUND OF THE INVENTION

1. Field of the Invention

The field of the invention is data processing, or, more specifically, methods, apparatus, and products implemented in or as computer peripheral expansion apparatus.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas of computer technology that has seen advancement is peripheral interconnect apparatus. Blade interconnections in particular have been developed to compact a very large quantity of computing power into a small physical space. As an aid to explanation, FIG. 1 sets forth a schematic functional block diagram of example prior art peripheral expansion apparatus implemented in the blade form factor, including a host blade (302) and three blade peripheral expansion units ('BPEUs') (304, 306, 308). The BPEUs are connected to the host blade through three separate peripheral interconnect buses ('PIBs') (326, 328, 330). PIB (326) separately connects the host blade to peripheral interconnect devices ('PIDs') on BPEU (304); PIB (328) separately connects the host blade to PIDs on BPEU (306); and PIB (330) separately connects the host blade to PIDs on BPEU (308). Each PIB requires a full set of PIB conductors and a full set of PIB pins on connectors (331, 332, 333) among the host blade and the BPEUs. Moreover, each PIB (326, 328, 330) is configured to carry data communication between the host blade and only one type of BPEU, and the PIBs will not support more than one PID at a same PIB address without contention.

SUMMARY OF THE INVENTION

Computer peripheral expansion apparatus, methods of operation, and computer program products including blade peripheral expansion units ('BPEUs'), each BPEU including a peripheral interconnect multiplexer coupled for peripheral interconnect data communications through an upstream peripheral interconnect bus ('PIB') segment to a host blade, the upstream PIB segment fanned out by the multiplexer into two or more peripheral downstream interconnect channels, the multiplexer connecting the upstream PIB segment to only one of the downstream channels at a time; and the two or more downstream peripheral interconnect channels, at least one of the downstream channels connected to at least one peripheral interconnect device ('PID') in the BPEU, the peripheral interconnect device being a device that communicates with the host blade according to a peripheral interconnect data communications protocol, one of the downstream channels configured to connect to an upstream PIB segment in another BPEU.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 2:
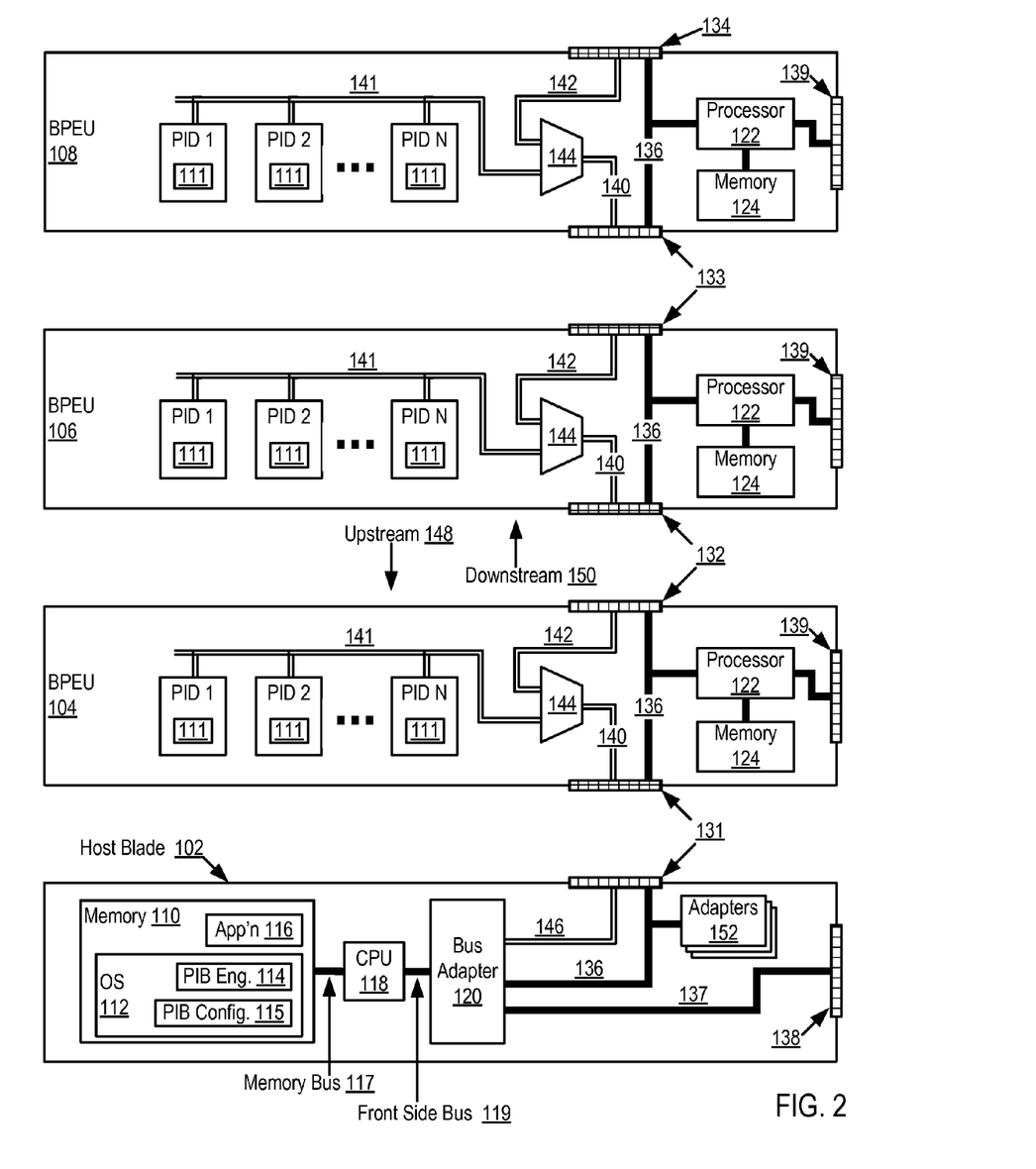
FIG. 2 sets forth a schematic functional block diagram of example peripheral expansion apparatus according to embodiments of the present invention.

Example methods, apparatus, and products implemented as or in computer peripheral expansion apparatus in accordance with embodiments of the present invention are described with reference to the accompanying drawings, beginning with FIG. 2. FIG. 2 sets forth a schematic functional block diagram of example peripheral expansion apparatus according to embodiments of the present invention. The example apparatus of FIG. 2 includes a host blade (102) and three blade peripheral expansion units ('BPEUs') (104, 106, 108). The host blade and the BPEUs are coupled for data communications through a peripheral interconnect bus ('PIB') composed in this example of a number of PIB segments (146, 140, 141, 142). A 'peripheral interconnect bus' or 'PIB,' as the term is used in this specification, refers to a service-level bus for out-of-band communications of data and instructions between a master service processor and slave processors located on peripheral devices. The service-level, out-of-band nature of the PIB makes its operations transparent to user-level operations. Such a PIB is used for communications with peripherals where simplicity and low manufacturing cost are more important than speed. There are a number of bus types that can be adapted as a PIB in peripheral expansion apparatus according to embodiments of the present invention, each of which is used with its own peripheral interconnect data communications protocol:

An I$^2$C bus, a serial computer bus invented by Philips that is used to for low-speed communications with peripheral components of a system. The name stands for Inter-Integrated Circuit and is pronounced I-squared-C or sometimes as I-two-C.

A System Management Bus ('SMBus'), another two-wire bus used for low-bandwidth communications among components of a system, especially power related chips such as a laptop's rechargeable battery subsystem, as well as other components such temperature sensors and lid switches. The SMBus is an enhanced implementation of I$^2$C.

An Intelligent Platform Management Bus ('IPMB'), a protocol of the Intelligent Platform Management Interface ('IPMI') specification, originally developed by Dell, HP, Intel, and NEC, defines a set of common interfaces to computer hardware and firmware designed to monitor system health and manage the system. The IPMB is also an enhanced implementation of I²C.

The Universal Serial Bus ('USB'), a serial bus standard for communications among hot swappable peripheral devices. Originally designed for computers, its flexibility has placed USB buses on video game consoles, PDAs, portable DVD and media players, cellphones; and even devices such as televisions, home stereo equipment, digital audio players, car stereos, and portable memory devices.

An ACCESS.bus ('A.b'), a peripheral-interconnect computer bus developed by Philips in the early 1990s. It is similar in purpose to USB, in that it allows low-speed devices to be added or removed from a computer on the fly, that is, hot swapped.

Others as will occur to those of skill in the art.

In this example, the processor (118) in the host blade is configured so that its functions include those of a master service processor under control of a PIB engine (114). The PIB engine (114) is a module of PIB control computer hardware and/or software represented here as installed in the computer memory (110) of the host blade. Peripheral interconnect devices (PID 1, PID 2, . . . , PID N) are connected to the PIB through PIB segments (141) in each BPEU, and each peripheral interconnect device is configured with a slave processor (111). Each PID can be, for example, an EEPROM storing non-volatile VPD, a systems management controller for a PCI BPEU, non-volatile RAM storing user settings, a low speed DAC or ADC, a Display Data Channel controller for contrast, hue, and color balance settings for a monitor, a sound volume controller for an intelligent speaker, a hardware monitors or diagnostic sensor such as a CPU thermostat or and fan speed controller, a real time clock, a power supply controller for power for system components, and other system-level components and devices as may occur to those of skill in the art. Data communications carried on the PIB in the direction from the BPEUs toward the host blade are characterized as 'upstream' (148), and data communications carried on the PIB in the direction from the host blade toward the BPEUs are characterized as 'downstream' (150).

The host blade (102) is an upstream computer or server implemented in a blade form factor with a stacking connector (131) configured to connect a PIB segment in the host blade to an upstream PIB segment in one of the BPEUs. 'Form factor' refers to the physical dimensions of computer components, and 'blade form factor' refers to a stripped down form of computer with a modular design optimized to minimize the use of physical space. The host blade is said to be either a computer generally or a server because, although it is most common to implement servers in blade form, many kinds of automated computing machinery are housed in a blade form factor, including, for example, data communications switches and routers, external computer storage, storage area network ('SAN') components, and even personal computers, and BPEUs implemented according to embodiments of the present invention typically also are implemented in the blade form factor. In the stripped down blade form, a host blade or a BPEU has many components of typical computers removed to save space, minimize power consumption and other considerations, while still having all the functional components to be considered a computer. A 'blade enclosure' or 'blade chassis,' which can hold multiple host blades as well as BPEUs, provides services such as power, cooling, networking, various interconnects and management. Together, blades and a blade enclosure form a blade system. Examples of host blades adaptable with peripheral expansion apparatus according to embodiments of the present invention include IBM's 'HS12' and 'HS22' blade servers, and examples of blade enclosures adaptable for use with peripheral expansion apparatus according to embodiments of the present invention include IBM's BladeCenter™ 'S' and 'H' blade chassis.

The host blade in this example includes one or more I/O adapters (152) coupled through an expansion bus (136), a bus adapter (120), and a high speed front side bus (119) to a computer processor or 'CPU' (118). The processor is connected through a high speed memory bus (117) to computer memory (110). The bus adapter (120) also connects the processor to backplane bus (137) and connector (138) for connection to a backplane of a blade enclosure—to acquire power, network connections, management services, and so on. Computer memory (110) can be implemented as random access memory and can also include non-volatile computer memory such as an optical disk drive, electrically erasable programmable read-only memory (so-called 'EEPROM' or 'Flash' memory), RAM drives, and so on, as will occur to those of skill in the art. The I/O adapters (152) implement user-oriented input/output through, for example, software drivers and computer hardware for controlling output to display devices such as computer display screens, as well as user input from user input devices such as keyboards and mice. A video adapter is a further example of an I/O adapter specially designed for graphic output to a display device such as a display screen or computer monitor.

A BPEU is an expansion unit or input/output ('I/O') adapter that adds function to a host blade by adding additional computer resources not otherwise directly available to the host, including, for example, additional memory, communications controllers, and I/O expansion slots. Examples of BPEUs that can be adapted as peripheral expansion apparatus according to embodiments of the present invention include:

IBM BladeCenter™ Memory and I/O Expansion Unit, part number 42C1600,

IBM BladeCenter™ Storage and I/O (SIO) Expansion Unit, part number 39R7563,

IBM BladeCenter™ PCI Expansion Unit II (PEU2), part number 25K8373, and

IBM BladeCenter™ PCI Express I/O Expansion Unit (PEU3e), 43W4391.

Each BPEU in the example of FIG. 2 is itself an instance of automated computing machinery. Each includes a computer processor (122) that is programmed with the contents of computer memory (124) to carry out the particular mission of each BPEU, whether it be a provision of additional memory, additional I/O resources, additional PCI connectivity, and so on. Each BPEU also includes backplane connectivity (139) for access to power and networking facilities of a blade enclosure.

Also in the example of FIG. 2, each BPEU (104, 106, 108) includes a peripheral interconnect multiplexer (144) coupled for peripheral interconnect data communications through an upstream PIB segment (140) to a host blade (102). Each multiplexer (144) fans out the upstream PIB segment (150) into two or more peripheral downstream interconnect channels (141, 142). Each multiplexer (144) is configured so as to connect the upstream PIB segment (140) to only one of the downstream channels (141, 142) at a time. At least one of the downstream channels (141) is connected to at least one peripheral interconnect device (PID 1, PID 2, . . . , PID N) in the BPEU, and one, exactly one, actually, of the downstream channels (142) is configured to connect to an upstream PIB segment (140) in another BPEU. Each peripheral interconnect device ('PID') is an electronic component of a BPEI that communicates with the host blade according to a peripheral interconnect data communications protocol such as an I²C protocol, an SMBus protocol, an IPMB protocol, and so on. Examples of multiplexers that can be adapted as peripheral interconnect multiplexers for peripheral interconnect apparatus according to embodiments of the present invention include, for example, NXP Semiconductor's PCA9543 and PCA9543. The PCA9543 is a multiplexer that fans out a single upstream I²C bus segment into two downstream channels, and the PCA9543 is a multiplexer that fans out a single upstream I²C bus segment into four downstream channels. The number of downstream channels is not a limitation of the present invention, except that at least two are needed, one (141) for connections to PIDs on a BPEU and one more (142) for connections to a next BPEU.

Figure 1:
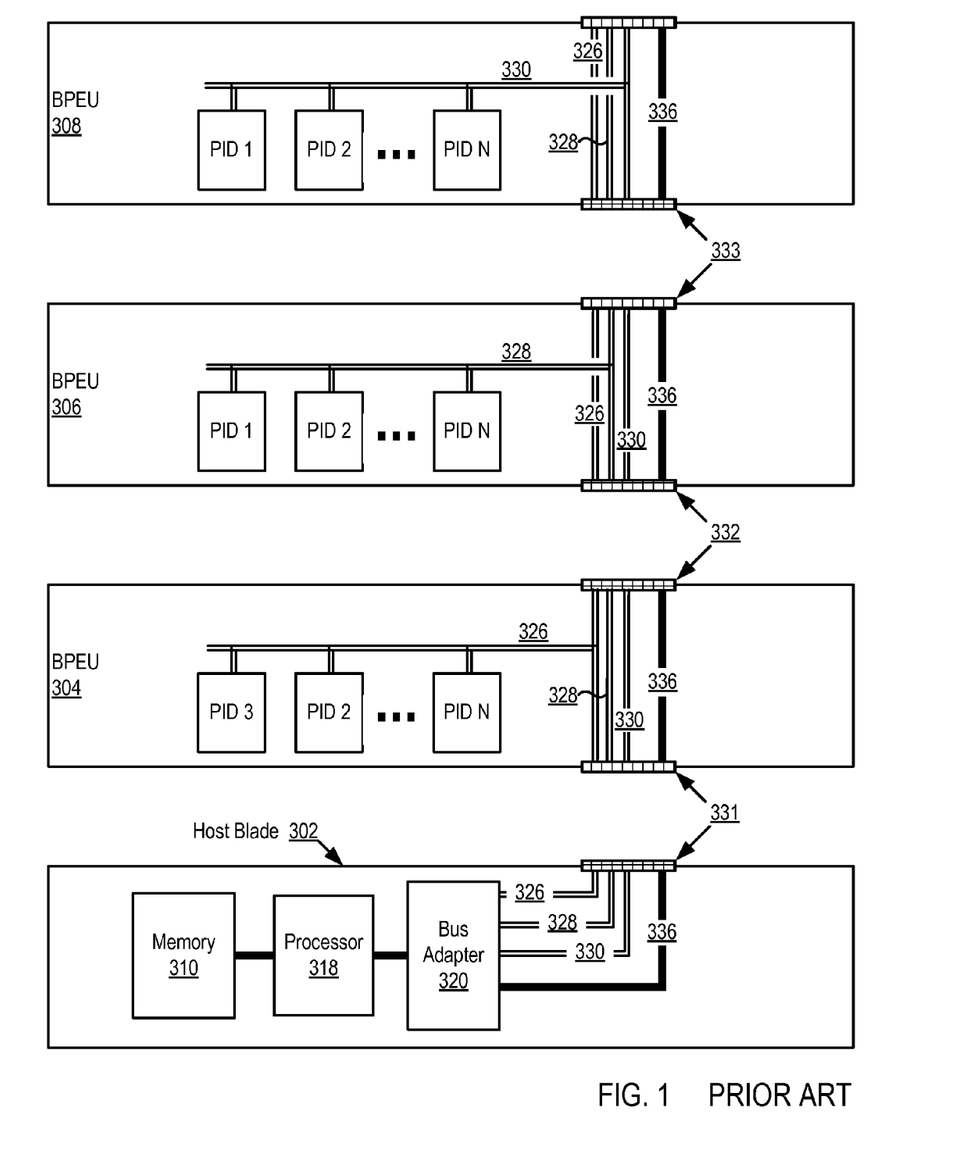
FIG. 1 sets forth a schematic functional block diagram of example prior art peripheral expansion apparatus.
Figure 3:
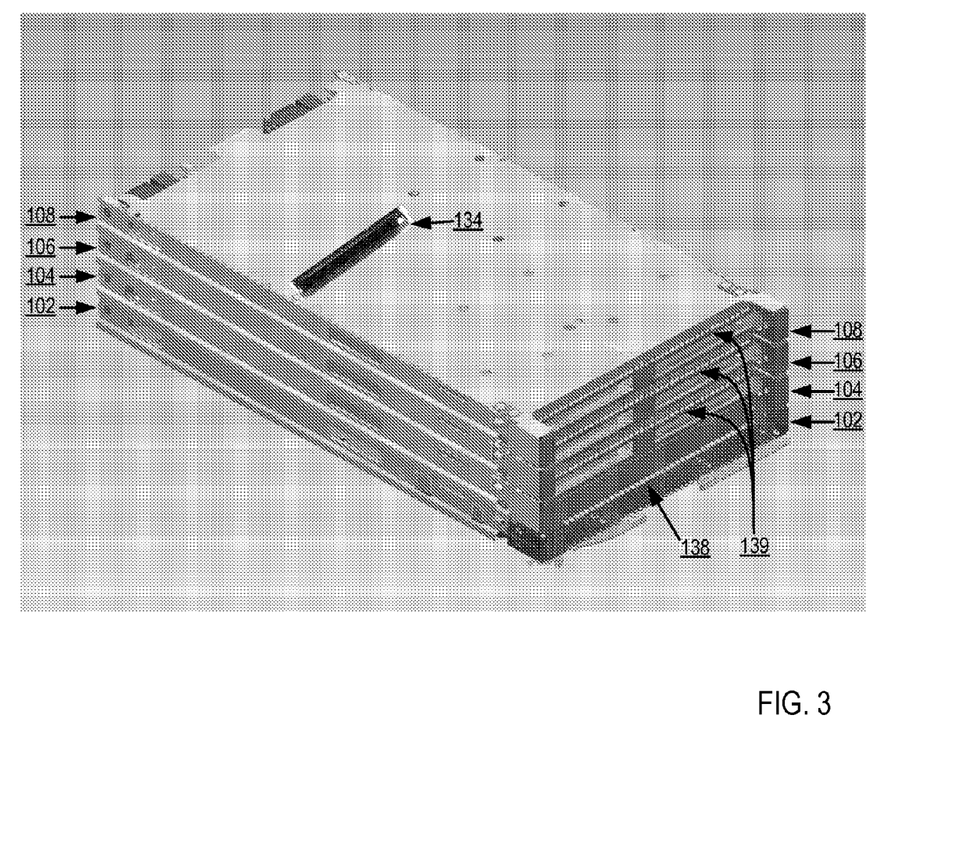
FIG. 3 sets forth a front-left vertical view of BPEUs stacked upon a host blade according to embodiments of the present invention FIG. 4 sets forth a flow chart illustrating an example method of peripheral interconnect data communications according to embodiments of the present invention.

In the example apparatus of FIG. 1, the BPEUs are stacked. A first BPEU (104) is stacked directly upon the host blade (102) with the first BPEU's upstream PIB segment (140) connected directly through a stacking connector (131) to a PIB segment (146) in the host blade (102). In addition, a second BPEU (106) is stacked upon the first BPEU (104) with the second BPEU's upstream PIB segment (140) connected through a stacking connector (132) to the one of the downstream channels (142) in the first BPEU that is configured to connect to an upstream PIB in another BPEU—the other BPEU in this example being BPEU (106). In addition in this particular example, a third BPEU (108) is stacked upon the second BPEU (106) with the third BPEU's upstream PIB segment (140) connected through a stacking connector (133) to the one of the downstream channels (142) in the second BPEU that is configured to connect to an upstream PIB in another BPEU—the other BPEU in this example being BPEU (108). In each case the stacking connector (131, 132, 133) is an expansion bus connector, such as a PCI connector, a PCIe connector, a SCSI connector, or the like, adapted according to embodiments of the present invention to include a set of PIB pins sufficient to connect segments of a PIB bus, for example, an I²C bus, a SMBus, and so on, between stacked BPEUs (104, 106, 108) or between a first stacked BPEU (104) and the host blade (102). For further explanation of stacking BPEUs, FIG. 3 sets forth a front-left vertical view of three BPEUs (104, 106, 108) stacked upon a host blade (102) according to embodiments of the present invention with backplane connectors (138, 139) and an illustration of a stacking connector (134) visible on the top of the stacked BPEUs.

In the apparatus of FIG. 2, with a number of BPEUs (104, 106, 108) stacked upon the host blade (102), the host blade is coupled for PIB communications to all of the stacked BPEUs through a single PIB segment (146) and therefore also through a single set of PIB pins in the stacking connector (131) between the host blade and the first stacked BPEU (104). In addition, in this architecture, with a number of BPEUs (104, 106, 108) stacked upon the host blade (102), a PID on the first BPEU and a PID on the second BPEU can share a same PIB address with no PIB contention. Address sharing without contention is this example is supported by PIB configuration information (115) stored in computer memory (110) in the host blade. The host blade is configured with PIB configuration information (115) associations of PIB addresses of the PIDs, channels, and PIB addresses of the multiplexers—which can be formatted, for example, as shown in Table 1.

Table 1—PIB Configuration Information

TABLE 1

| | | | PIB Configuration Information | | | |
|---|---|---|---|---|---|---|
| PID Description | BPEU Ident. | Stack Location | Mux Address | PID Channel | Next Mux Channel | PID Address |
| VPD | 104 | 1 | 0xE0 | 141 | 142 | 0xA0 |
| User Settings | 104 | 1 | 0xE0 | 141 | 142 | 0xA1 |
| VPD | 106 | 2 | 0xE1 | 141 | 142 | 0xA0 |
| User Settings | 106 | 2 | 0xE1 | 141 | 142 | 0xA1 |
| VPD | 108 | 3 | 0xE2 | 141 | 142 | 0xA0 |
| User Settings | 108 | 3 | 0xE2 | 141 | 142 | 0xA1 |

Each record in Table 1 associates PIB addresses of PIDs, channels, and PIB addresses of multiplexers. That is, each record in Table 1 provides all the information needed for a master processor in a host blade to carry out PIB communications with PIDs on stacked BPEUs even if some of the PIDs share same PIB addresses across BPEUs. Multiplexer addresses are in the column labeled "Mux Address." The "PID Channel" column indicates which downstream channels in each BPEU has PIDs connected to it. The "PID Address" column indicates the PIB addresses of PIDs. The addresses are example PIB addresses, such as I²C or SMBus addresses, represented here as seven-bit hexadecimal addresses.

The "Next Mux Channel" indicates which one of the downstream channels is configured to connect to an upstream PIB segment in another BPEU. In addition to the associations of PIB addresses of PIDs, channels, and PIB addresses of multiplexers, each record in Table 1 also includes in the column labeled "PID Description" a description of the PID whose configuration information is represented by the record. Each record also includes in the column labeled "BPEU Ident." identification information for each BPEU—here using the reference numbers from FIG. 2. Each record also includes in the column labeled "Stack Location" the location within a stack of BPEUs for each BPEU in the stack, with BPEU (104) first, BPEU (106) second, and BPEU (108) third.

Readers will notice that the PID Address 0xA0 is the same for all three VPD PIDs on all three BPEUs, and that the PID Address 0xA1 is the same for all three User Settings PIDs on all three BPEUs. In any given downstream channel to which PIDs are connected, however, all the PID addresses are unique. Addresses can be shared across channels or across BPEUs without contention because only one PIB channel at a time is connected through multiplexers to the host blade. Each multiplexer (144) connects its upstream PIB segment (140) to only one of its downstream channels (141, 142) at a time. Moreover, each multiplexer connects its upstream PIB segment (140) to a selected one of the downstream channels (141, 142) in accordance with a PIB channel selection instruction from the host blade. Such an instruction can take the form, for example, of an I²C WRITE instruction containing the identity of the selected downstream channel. Such an instruction is issued to the multiplexer at, for example, the mux address taken for that multiplexer from Table 1. The multiplexer stores the payload of the WRITE instruction, decodes the identity of the selected channel, and connects the selected channel, only the selected channel, to its upstream PIB segment (140). The host blade can then carry out peripheral interconnect data communications with PIDs on the BPEUS by configuring a PIB connection, by use of channel selection instructions, between the host blade and a selected one of the downstream channels connected to PIDs on the BPEUs and then carrying out data communications on the configured connection between the host blade and one or more of the PIDs connected to the selected downstream channel—according to whatever peripheral interconnect data communications protocol is in use, I²C, SMBus, or the like. More particularly, using the information in the records of Table 1:

- The host blade can configure a PIB connection with a VPD PID on BPEU (104) by instructing the multiplexer (144) at PIB address 0xE0 to connect its upstream PIB segment (140) to its downstream channel (141)—after which the host blade can communicate with the VPD PID at address 0xA0 on BPEU (104) through PIB segments (146) in the host blade, (140) in BPEU (104), and (141) in BPEU (104). The host blade can always issue this instruction to the multiplexer in BPEU (104) because BPEU (104) is in stack position 1, with its multiplexer always connected direct to the host blade through its upstream PIB segment (140) and PIB segment (146) in the host blade.
- The host blade can configure a PIB connection with a User Settings PID on BPEU (104) by instructing the multiplexer (144) at PIB address 0xE0 to connect its upstream PIB segment (140) to its downstream channel (141)—after which the host blade can communicate with the User Settings PID at address 0xA1 on BPEU (104) through PIB segments (146) in the host blade, (140) in BPEU (104), and (141) in BPEU (104). The host blade can always issue this instruction to the multiplexer in BPEU (104) because BPEU (104) is in stack position 1, with its multiplexer always connected direct to the host blade through its upstream PIB segment (140) and PIB segment (146) in the host blade.
- The host blade can configure a PIB connection with a VPD PID on BPEU (106) by instructing the multiplexer (144) at PIB address 0xE0 to connect its upstream PIB segment (140) to its downstream channel (142) and then instructing the multiplexer (144) at PIB address 0xE1 to connect its upstream PIB segment (140) to its downstream channel (141)—after which the host blade can communicate with the VPD PID at address 0xA0 on BPEU (106) through PIB segments (146) in the host blade, (140) in BPEU (104), (142) in BPEU (104), (140) in BPEU (106), and (141) in BPEU (106). The host blade can only issue the connection instruction to the multiplexer in BPEU (106) after instructing the multiplexer in BPEU (104) to connect its downstream channel (142) because BPEU (106) is in stack position 2, with its multiplexer connected to the host blade only indirectly through BPEU (104).
- The host blade can configure a PIB connection with a User Settings PID on BPEU (106) by instructing the multiplexer (144) at PIB address 0xE0 to connect its upstream PIB segment (140) to its downstream channel (142) and then instructing the multiplexer (144) at PIB address 0xE1 to connect its upstream PIB segment (140) to its downstream channel (141)—after which the host blade can communicate with the User Settings PID at address 0xA1 on BPEU (106) through PIB segments (146) in the host blade, (140) in BPEU (104), (142) in BPEU (104), (140) in BPEU (106), and (141) in BPEU (106). The host blade can only issue the connection instruction to the multiplexer in BPEU (106) after instructing the multiplexer in BPEU (104) to connect its downstream channel (142) because BPEU (106) is in stack position 2, with its multiplexer connected to the host blade only indirectly through BPEU (104).
- Similarly, the host blade can configure a PIB connection with a VPD PID on BPEU (108) by instructing the multiplexer (144) at PIB address 0xE0 to connect its upstream PIB segment (140) to its downstream channel (142), instructing the multiplexer (144) at PIB address 0xE1 to connect its upstream PIB segment (140) to its downstream channel (142), and instructing the multiplexer (144) at PIB address 0xE2 to connect its upstream PIB segment (140) to its downstream channel (141)—after which the host blade can communicate with the VPD PID at address 0xA0 on BPEU (108) through PIB segments (146) in the host blade, (140) in BPEU (104), (142) in BPEU (104), (140) in BPEU (106), (142) in BPEU (106), (140) in BPEU (108), and (141) in BPEU (108).
- And further similarly, the host blade can configure a PIB connection with a User Settings PID on BPEU (108) by instructing the multiplexer (144) at PIB address 0xE0 to connect its upstream PIB segment (140) to its downstream channel (142), instructing the multiplexer (144) at PIB address 0xE1 to connect its upstream PIB segment (140) to its downstream channel (142), and instructing the multiplexer (144) at PIB address 0xE2 to connect its upstream PIB segment (140) to its downstream channel (141)—after which the host blade can communicate with the User Settings PID at address 0xA1 on BPEU (108) through PIB segments (146) in the host blade, (140) in BPEU (104), (142) in BPEU (104), (140) in BPEU (106), (142) in BPEU (106), (140) in BPEU (108), and (141) in BPEU (108).

The arrangement of the BPEUs, the PIDs, the multiplexers, the buses, and other devices making up the example peripheral interconnect apparatus illustrated in FIG. 2 are for explanation, not for limitation. Data processing systems useful for peripheral interconnection according to various embodiments of the present invention may include additional buses, connectors, processors, integrated circuits and other devices, not shown in FIG. 2, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 2.

Figure 4:
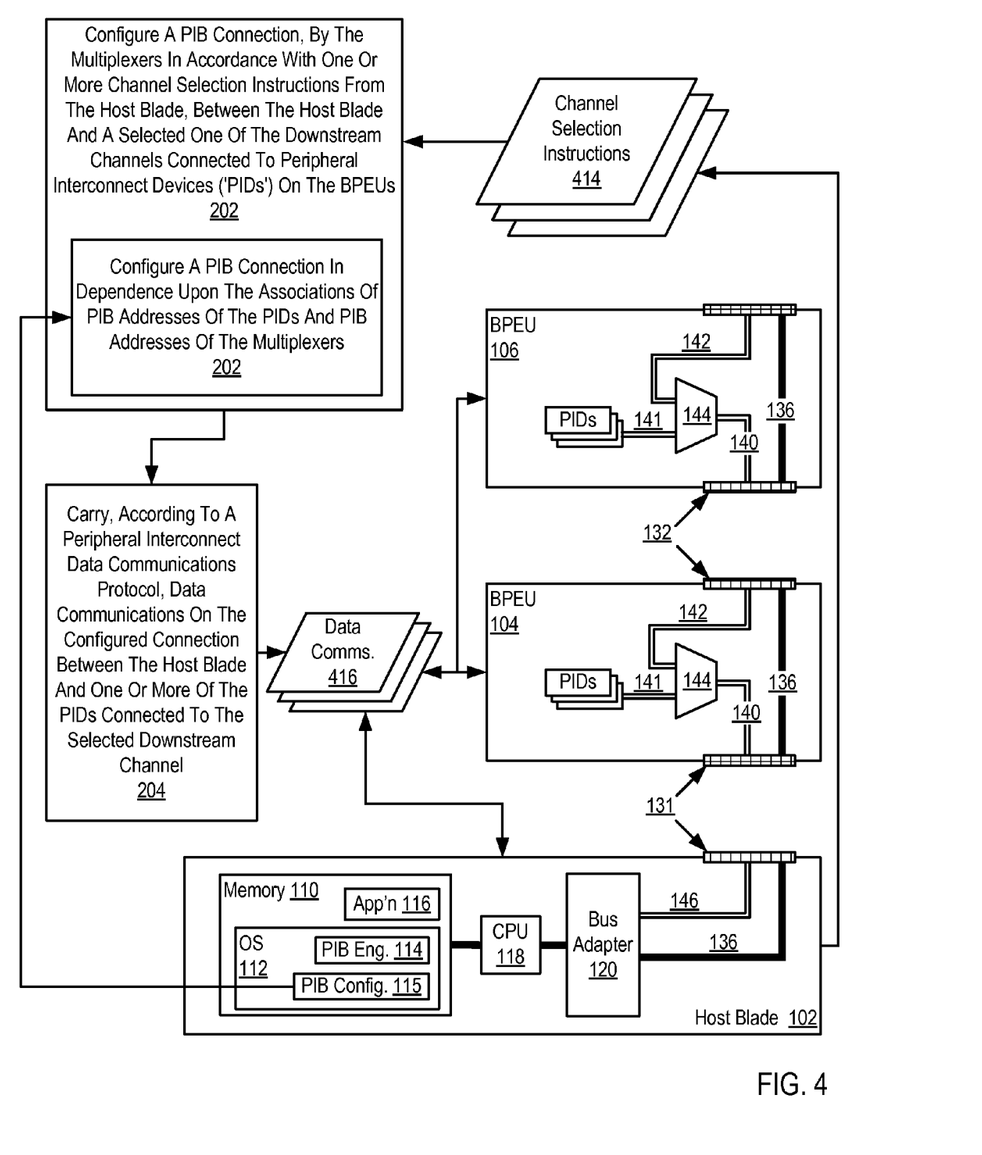

For further explanation, FIG. 4 sets forth a flow chart illustrating an example method of peripheral interconnect data communications according to embodiments of the present invention. The method of FIG. 4 is carried out by and upon peripheral expansion apparatus of the kind illustrated and described above with reference to FIGS. 2 and 3, including BPEUs, PIDs, peripheral interconnect multiplexers, PIBs, stacking connectors, and so on. The method of FIG. 4, therefore, is described with reference both to FIG. 4 and also to FIGS. 2 and 3, using reference numbers from all three of these drawings.

The method of FIG. 4 includes configuring (202) a PIB connection (140, 141, 142), by the multiplexers (144) in accordance with one or more channel selection instructions (414) from the host blade (102), between the host blade and a selected one of the downstream channels (141) connected to peripheral interconnect devices ('PIDs') on the BPEUs and carrying (204), according to a peripheral interconnect data communications protocol, data communications (416) on the configured connection between the host blade and one or more of the PIDs connected to the selected downstream channel. In this example, the host blade (102) is configured (115) with associations of PIB addresses of the PIDs, channels, and PIB addresses of the multiplexers like those illustrated and described above with regard to Table 1, and configuring (202) a PIB connection in the method of FIG. 4 includes configuring (202) a PIB connection in dependence upon the associations of PIB addresses of the PIDs, channels, and PIB addresses of the multiplexers. Taking the selected downstream channel connected to PIDs as channel (141) on BPEU (106), for example, then the configured PIB connection would be formed of channel (141) on BPEU (106), upstream PIB segment (140) on BPEU (106), channel (142) on BPEU (104), upstream PIB segment (140) on BPEU (104), and PIB segment (146) on the host blade (102). This PIB connection would be configured according to two host blade connection instructions, one instruction to the peripheral interconnect multiplexer (144) in BPEU (104) to connect its downstream channel (142) to its upstream PIB segment (140) and another instruction to the peripheral interconnect multiplexer (144) in BPEU (106) to connect its downstream channel (141) to its upstream PIB segment (140).

In view of the explanations set forth above, readers will recognize that the benefits of computer peripheral expansion apparatus configured according to embodiments of the present invention include:

PIB simplicity: only one set of PIB conductors among the host blade and multiple BPEUs, only one set of PIB pins in connectors among the host blade and multiple BPEUs, and flexible peripheral interconnect architecture: use of a same peripheral address among PIDs across BPEUs without contention, use of multiple BPEUs of a same type on a single PIB.

Example embodiments of the present invention are described in this specification generally in the context of fully functional computer peripheral interconnect apparatus, including automated computing machinery. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Readers will recognize also that many computer systems having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented entirely as firmware or entirely as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. Computer peripheral expansion apparatus comprising one or more blade peripheral expansion units ('BPEUs'), each BPEU comprising:

a peripheral interconnect multiplexer coupled for peripheral interconnect data communications through an upstream peripheral interconnect bus ('PIB') segment to a host blade, the upstream PIB segment fanned out by the multiplexer into two or more peripheral downstream interconnect channels, the multiplexer connecting the upstream PIB segment to only one of the downstream channels at a time; and the two or more downstream peripheral interconnect channels, at least one of the downstream channels connected to at least one peripheral interconnect device ('PID') in the BPEU, the peripheral interconnect device comprising a device that communicates with the host blade according to a peripheral interconnect data communications protocol, one of the downstream channels configured to connect to an upstream PIB segment in another BPEU.

2. The apparatus of claim 1 wherein the host blade comprises an upstream computer or server implemented in a blade form factor including a stacking connector configured to connect a PIB segment in the host blade to an upstream PIB segment in one of the BPEUs.

3. The apparatus of claim 1 wherein the host blade is configured with associations of PIB addresses of the PIDs, channels, and PIB addresses of the multiplexers.

4. The apparatus of claim 1 wherein the multiplexer connecting the upstream PIB segment to only one of the downstream channels at a time further comprises the multiplexer connecting the upstream PIB segment to a selected one of the downstream channels in accordance with a PIB channel selection instruction from the host blade.

5. The apparatus of claim 1 wherein:

a first one of the BPEUs is stacked directly upon the host blade with the first BPEU's upstream PIB segment connected directly through a stacking connector to a PIB segment in the host blade; and a second one of the BPEUs is stacked upon the first BPEU with the second BPEU's upstream PIB segment connected through a stacking connector to the one of the downstream channels in the first BPEU configured to connect to an upstream PIB segment in another BPEU.

6. The apparatus of claim 1 wherein a first one of the BPEUs and a second one of the BPEUs are stacked upon the host blade, and a PID on the first BPEU and a PID on the second BPEU share a same PIB address with no PIB contention.

7. The apparatus of claim 1 wherein a plurality of the BPEUs are stacked upon the host blade, and the host blade is coupled for PIB communications to all of the stacked BPEUs through a single PIB segment and a single set of PIB pins.

8. A method of peripheral interconnect data communications for computer peripheral expansion apparatus comprising one or more blade peripheral expansion units (BPEUs), each BPEU comprising:

a peripheral interconnect multiplexer coupled for peripheral interconnect data communications through an upstream peripheral interconnect bus ('PIB') segment to a host blade, the upstream PIB segment fanned out by the multiplexer into two or more peripheral downstream interconnect channels, the multiplexer connecting the upstream PIB segment to only one of the downstream channels at a time; and the two or more downstream peripheral interconnect channels, at least one of the downstream channels connected to peripheral interconnect devices ('PIDs') on the BPEU, the peripheral interconnect device comprising a device that communicates with the host blade according to a peripheral interconnect data communications protocol, one of the downstream channels configured to connect to an upstream PIB in another BPEU;

the method comprising:
configuring a PIB connection, by the multiplexers in accordance with one or more channel selection instructions from the host blade, between the host blade and a selected one of the downstream channels connected to peripheral interconnect devices ('PIDs') on the BPEUs; and carrying, according to the peripheral interconnect data communications protocol, data communications on the configured connection between the host blade and one or more of the PIDs connected to the selected downstream channel.

9. The method of claim 8 wherein the host blade is configured with associations of PIB addresses of the PIDs, channels, and PIB addresses of the multiplexers, and configuring a PIB connection further comprises configuring a PIB connection in dependence upon the associations of PIB addresses of the PIDs, channels, and PIB addresses of the multiplexers.

10. The method of claim 8 wherein the host blade comprises an upstream computer or server implemented in a blade form factor including a stacking connector configured to connect a PIB segment in the host blade to an upstream PIB segment in one of the BPEUs.

11. The method of claim 8 wherein a first one of the BPEUs is stacked directly upon the host blade with the first BPEU's upstream PIB segment connected directly through a stacking connector to a PIB segment in the host blade.

12. The method of claim 8 wherein:
a first one of the BPEUs is stacked directly upon the host blade with the first BPEU's upstream PIB segment connected directly through a stacking connector to a PIB segment in the host blade; and
a second one of the BPEUs is stacked upon the first BPEU with the second BPEU's upstream PIB segment connected through a stacking connector to the one of the downstream channels in the first BPEU configured to connect to an upstream PIB in another BPEU.

13. The method of claim 8 wherein a first one of the BPEUs and a second one of the BPEUs are stacked upon the host blade, and a PID on the first BPEU and a PID on the second BPEU share a same PIB address with no PIB contention.

14. The method of claim 8 wherein a plurality of the BPEUs are stacked upon the host blade, and the host blade is coupled for PIB communications to all of the stacked BPEUs through a single PIB segment and a single set of PIB pins.

15. A computer program product for peripheral interconnect data communications on computer peripheral expansion apparatus comprising one or more blade peripheral expansion units ('BPEUs'), each BPEU comprising:
a peripheral interconnect multiplexer coupled for peripheral interconnect data communications through an upstream peripheral interconnect bus ('PIB') segment to a host blade, the upstream PIB segment fanned out by the multiplexer into two or more peripheral downstream interconnect channels, the multiplexer connecting the upstream PIB segment to only one of the downstream channels at a time; and
the two or more downstream peripheral interconnect channels, at least one of the downstream channels connected to peripheral interconnect devices ('PIDs') on the BPEU, the peripheral interconnect device comprising a device that communicates with the host blade according to a peripheral interconnect data communications protocol, one of the downstream channels configured to connect to an upstream PIB in another BPEU;
the computer program product disposed in a computer-readable recording medium, the computer program product comprising computer program instructions capable, when executed on a processor of the host blade, of causing the computer peripheral expansion apparatus to function by:
configuring a PIB connection, by the multiplexers in accordance with one or more channel selection instructions from the host blade, between the host blade and a selected one of the downstream channels connected to peripheral interconnect devices ('PIDs') on the BPEUs; and
carrying, according to the peripheral interconnect data communications protocol, data communications on the configured connection between the host blade and one or more of the PIDs connected to the selected downstream channel.

16. The computer program product of claim 15 wherein the host blade is configured with associations of PIB addresses of the PIDs, channels, and PIB addresses of the multiplexers, and configuring a PIB connection further comprises configuring a PIB connection in dependence upon the associations of PIB addresses of the PIDs, channels, and PIB addresses of the multiplexers.

17. The computer program product of claim 15 wherein the host blade comprises an upstream computer or server implemented in a blade form factor including a stacking connector configured to connect a PIB segment in the host blade to an upstream PIB segment in one of the BPEUs.

18. The computer program product of claim 15 wherein:
a first one of the BPEUs is stacked directly upon the host blade with the first BPEU's upstream PIB segment connected directly through a stacking connector to a PIB segment in the host blade; and
a second one of the BPEUs is stacked upon the first BPEU with the second BPEU's upstream PIB segment connected through a stacking connector to the one of the downstream channels in the first BPEU configured to connect to an upstream PIB in another BPEU.

19. The computer program product of claim 15 wherein a first one of the BPEUs and a second one of the BPEUs are stacked upon the host blade, and a PID on the first BPEU and a PID on the second BPEU share a same PIB address with no PIB contention.

20. The computer program product of claim 15 wherein a plurality of the BPEUs are stacked upon the host blade, and the host blade is coupled for PIB communications to all of the stacked BPEUs through a single PIB segment and a single set of PIB pins.

* * * * *